United States Patent [19]

Toida et al.

[11] Patent Number: 5,048,326
[45] Date of Patent: Sep. 17, 1991

[54] SURFACE ROUGHNESS MEASURING INSTRUMENT

[75] Inventors: Yoichi Toida, Chigasaki; Chihiro Marumo, Yokohama, both of Japan

[73] Assignee: Mitutoyo Corporation, Tokyo, Japan

[21] Appl. No.: 432,909

[22] Filed: Nov. 7, 1989

[30] Foreign Application Priority Data

Nov. 9, 1988 [JP] Japan ................... 63-283127

[51] Int. Cl.[5] .................. G01B 21/30; G01B 5/28
[52] U.S. Cl. ........................................... 73/105
[58] Field of Search .................................. 73/105

[56] References Cited

U.S. PATENT DOCUMENTS

| | | | |
|---|---|---|---|
| 2,363,691 | 11/1944 | Reason | 73/105 |
| 2,372,451 | 3/1945 | Reason | 73/105 |
| 2,491,016 | 12/1949 | Reason | 73/105 |
| 2,778,497 | 1/1957 | Bickley | 73/105 X |
| 3,768,307 | 10/1973 | Rode | 73/105 |
| 4,306,455 | 12/1981 | Selleri | 73/865.8 |
| 4,765,181 | 8/1988 | Numoto et al. | 73/105 |
| 4,776,211 | 10/1988 | Griswold, Jr. | 73/105 |
| 4,776,212 | 10/1988 | Parsons et al. | 73/105 |
| 4,801,020 | 1/1989 | Rogne et al. | 209/538 |
| 4,969,361 | 11/1990 | Kawasaki et al. | 73/105 |

FOREIGN PATENT DOCUMENTS

| | | | |
|---|---|---|---|
| 133554 | 5/1946 | Australia | 73/105 |
| 1245665 | 10/1960 | France | 73/105 |
| 153568 | 6/1963 | U.S.S.R. | 73/105 |
| 236776 | 6/1969 | U.S.S.R. | 73/105 |
| 1042367 | 9/1966 | United Kingdom | 73/105 |
| 1171353 | 11/1969 | United Kingdom | 73/105 |

Primary Examiner—Tom Noland
Attorney, Agent, or Firm—Oliff & Berridge

[57] ABSTRACT

A surface roughness measuring instrument is provided with a rotary drive mechanism configured such that two rollers support a sphere at three points, yet the driving torque applied to the sphere at those three points all give an equal tangential velocity. A detector arm is provided between the mounting section for mounting to the surface roughness measuring instrument itself and a tip section which holds skids which make contact with the object to be measured, so that these two sections are able to rock relative to each other about an axis in the direction in which the detector arm extends. Surface roughness in the circumferential direction of a body of rotation can be measured accurately and stably.

8 Claims, 13 Drawing Sheets

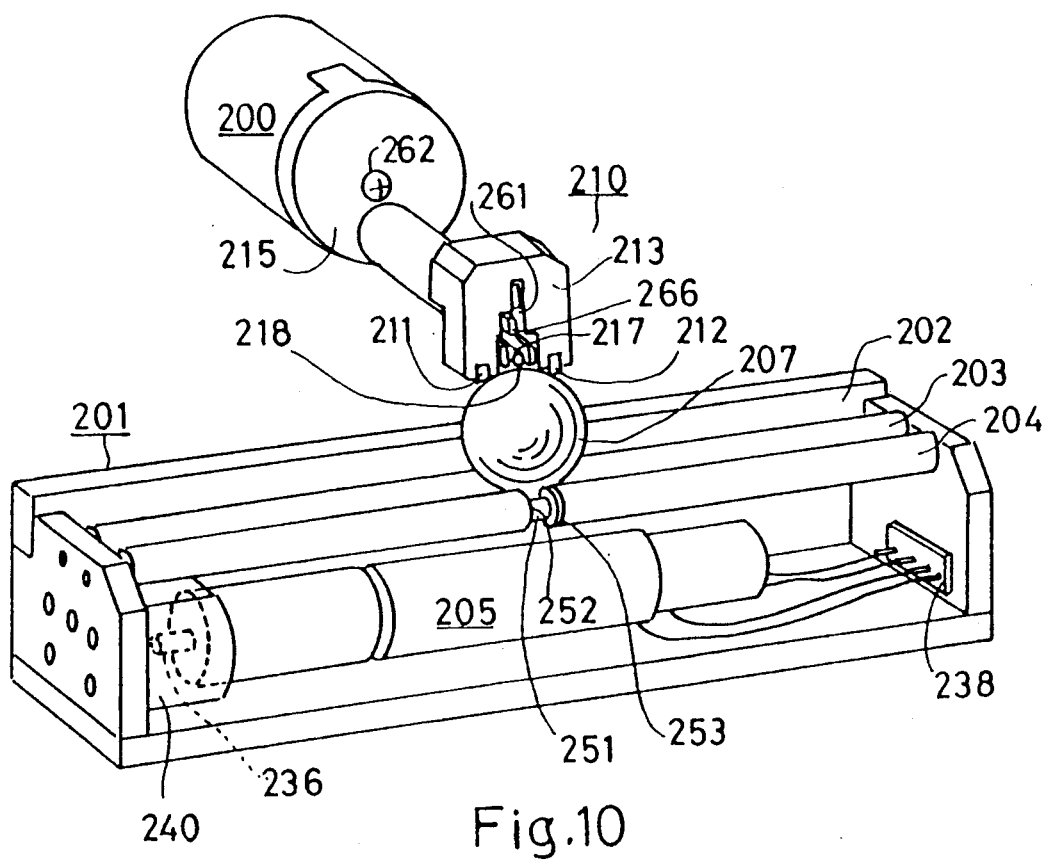
Fig.10
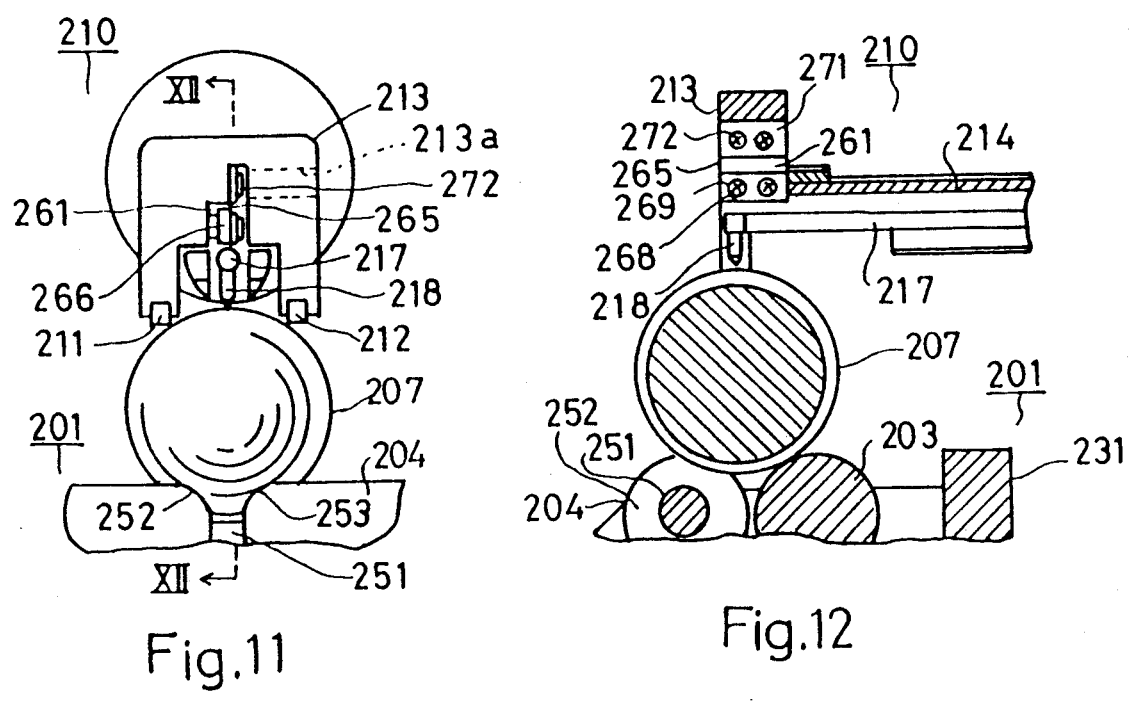
Fig.11
Fig.12

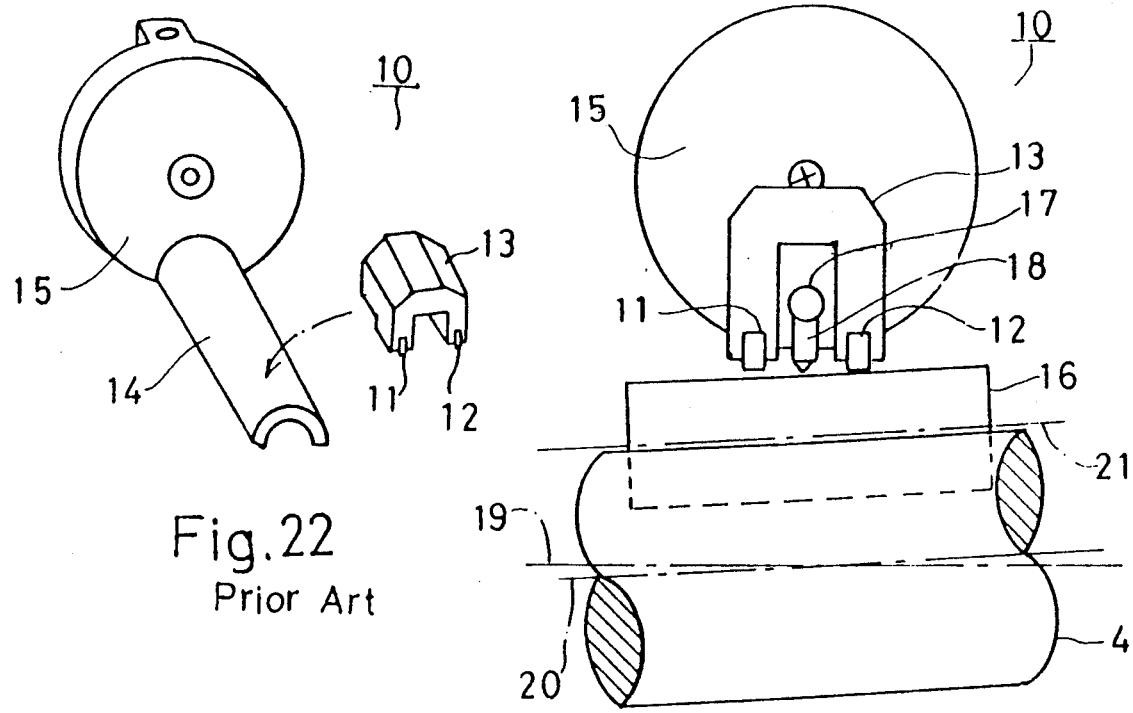
Fig.22 Prior Art
Fig.24 Prior Art
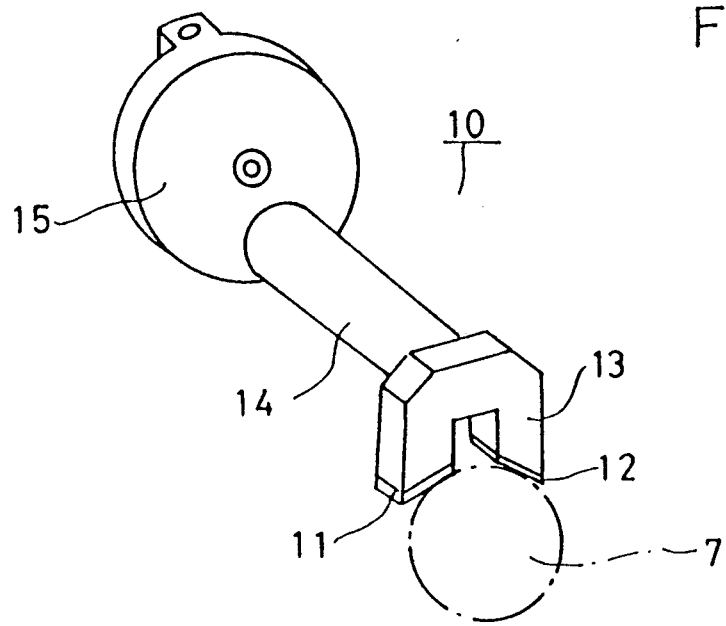
Fig.23 Prior Art

SURFACE ROUGHNESS MEASURING INSTRUMENT

BACKGROUND OF THE INVENTION

1. Field of the Invention

This invention relates to a surface roughness measuring instrument and specifically to a surface roughness measuring instrument used to measure the surface roughness of spheres, solid or hollow cylinders and the like.

2. Prior Art Statement

The increasing complexity of advanced industrial products and trends toward smaller, lighter, thinner and more compact products have created demand for higher precision machining technologies. Surface roughness measuring instruments for measuring the surface working precision of various objects are employed to this end.

When measuring the surface roughness of a solid or hollow cylinder or other body of revolution in the circumferential direction, the use of an instrument in which the body of revolution is supported on a pair of rollers arranged in parallel and measured while being rotated by one of the rollers is common knowledge.

However, various problems remain with these body-of-rotation surface roughness measuring instruments described above.

Specifically, if such a device for measuring the surface roughness of a solid or hollow cylinder or other body of revolution in the circumferential direction were to be used to support and rotate a sphere, the sphere would roll back and forth along the rollers, making measurement impossible. To remedy this situation, there have been previous attempts to provide a continuous groove around the circumference of one of the rollers and fit the sphere into the groove so that it is supported in a fixed position on the roller without impeding its natural rotation.

For example, the rotary drive mechanism 1 of a surface roughness measuring instrument shown in FIG. 18 is provided with a pair of parallel rollers 3 and 4 arranged in a frame 2 and a rotary drive motor 5 which drives these rollers to rotate. A continuous groove 6 which has a V-shaped cross section is formed around the circumference of roller 4. Thus when a sphere 7 is placed on the two rollers 3 and 4, the sphere 7 fits into the groove 6 and its back and forth motion along rollers 3 and 4 is controlled so that it rotates in a fixed position on rollers 3 and 4.

With this sort of rotary drive mechanism, the groove allows the sphere to be supported by the two rollers at three points, so it will not roll back and forth along the rollers. However, since only one of the pair of rollers is driven, in the case of a sphere of low weight or in other cases, friction from the other roller acts to prevent the smooth rotation of the sphere. In contrast, if both rollers are synchronously driven at equal speeds, the sphere will rotate smoothly.

However, in the case of the rotary drive mechanism 1 of FIG. 18 above in which a groove 6 is provided to support the sphere 7, if one attempts to drive both rollers 3 and 4, the angular velocities at the three points of contact between the sphere 7 and rollers 3 and 4 must all be made equal.

Specifically, when the sphere 7 is fit into a groove 6 on roller 4 as shown in FIG. 19, the radius of rotation $R_1$ of the point of contact with respect to axis of rotation $A_2$ is equal to the radius $R_0$ of roller 4, but the radius of rotation $r_1$ of the sphere 7 about its axis of rotation $A_1$ is shorter than the radius $r_0$ of the sphere 7, so the sphere 7 will rotate with a greater angular velocity than the angular velocity given it by roller 4. Furthermore, if the sphere 7 has a relatively small diameter as shown in FIG. 20, the sphere 7 and roller 4 will come into contact on the conical surfaces 8 and 9 which make up the groove 6, so not only is the radius of rotation $r_1$ of the point of contact on the sphere 7 side shorter than the radius $R_0$ of roller 4, but also the radius of rotation $R_1$ of the point of contact on the roller 4 side is also shorter than the radius $R_0$ of roller 4, so the difference in angular velocity provided by rollers 3 and 4 becomes even more complex.

Therefore, when attempting to drive both rollers 3 and 4 in the rotary drive mechanism 1 of FIG. 18, a problem occurs in that the sphere 7 cannot rotate stably.

To solve this problem, as in the rotary drive mechanism 1 shown in FIG. 21, similar grooves 6 can be provided on both rollers 3 and 4, so that the change in radii of rotation of the point of contact of sphere 7 with rollers 3 and 4 is equal for both rollers and the angular velocity provided by rollers 3 and 4 to the sphere 7 will always be equal.

However, in this mechanism 1, not only must identical grooves 6 be formed on each of the rollers 3 and 4, but the sphere 7 would be supported by four points, two on each of the grooves 6, so in order for accurate contact to be made at each point, precise axial orientation of rollers 3 and 4 to each other is necessary, so the complexity of manufacture and high costs becomes a problem.

Furthermore, the nose piece 10 of surface roughness measuring instruments used when measuring the surface roughness of a solid or hollow cylinder or other body of revolution in the circumferential direction conventionally has the same structure, shown in FIG. 22, as those used when measuring the surface roughness of a normal flat surface. Specifically, a tip section 13 containing skids 11 and 12 which touch the object being measured near the location being measured is secured to a protector 14 which covers and protects the stylus of the surface roughness measuring instrument and has a fixed position relative to mounting section 15 for mounting onto the surface roughness measuring instrument.

An alternate nose piece 10 for surface roughness measuring instruments for spheres has been proposed in which, as shown in FIG. 23, the skids 11 and 12 which touch the object being measured, namely a sphere 7, are provided with surfaces oriented nearly tangentially to the sphere, thus assuring that the contact is nearly tangential. However, with such a nose piece 10 for surface roughness measuring instruments, the tip section 13 which holds skids 11 and 12, as in the nose piece 10 shown in FIG. 22 above, is fixed relative to the mounting section 15 for mounting onto the surface roughness measuring instrument.

Yet as shown in FIG. 24, measurement of the surface roughness in the circumferential direction of the object being measured, namely a body of revolution 16, is normally carried out by supporting the body of revolution 16 on two rollers whose axes are mutually parallel. After a tip contact section 18, on the tip of a detector arm 17 of the surface roughness measuring instrument to which a nose piece 10 is attached, is placed in contact with the body of revolution 16, measurement is carried out as roller 4 is rotated to drive the body of revolution 16 so that it rotates in its circumferential direction.

However, in comparison to the numerical level of surface roughness to be found on the body of revolution 16, the cross-sectional shapes of the rollers which drive the body of revolution 16 are typically by no means perfect circles, and moreover the rollers are not driven and supported so that they will rotate in a perfectly circular fashion. Similarly, the cross-sectional shape of the body of revolution 16 itself cannot be called a perfect circle in comparison to the numerical level of surface roughness which is typically measured. Therefore, with the skids 11 and 12 each touching body of revolution 16 with approximately the same pressure, rocking of the axis of rotation 19 of the roller will occur for the reasons described above so that the roller will rotate about a tilted axis 20, and the body of revolution 16 will be driven so that it rotates about an axis of rotation 21 nearly parallel to axis of rotation 20. Thus the skids 11 and 12 which had initially protruded in a direction parallel to axis of rotation 19 would be in a state in which skid 11 is lifted away from the body of revolution 16 and only skid 12 remains in contact with the body of revolution 16. During measurement of surface roughness in this state, specifically the measurement of the up and down motion of tip contact section 18, there is a problem that added to the difference in the up and down position due to surface roughness of body of revolution 16 is a certain amount of error due to the position height of the point of contact of tip contact section 18 with respect to the point of contact of skid 12 on body of revolution 16. Particularly since this error is in fact of a numerical order greater than the amount of surface roughness to be found, the problem is extremely severe.

In the case of measuring the surface roughness of a sphere 7 by supporting the sphere 7 on rollers whose axes are mutually parallel and driving the sphere 7 to rotate by rotating a roller, since the relative position of the mounting section 15 for mounting onto the surface roughness measuring instrument and the tip section 13 which supports skids 11 and 12 is also similarly fixed, the same problem described above occurs.

SUMMARY OF THE INVENTION

The present invention came about in light of the above, and its object is to provide a surface roughness measuring instrument which can accurately and stably measure the surface roughness of a body of revolution in the circumferential direction and the surface roughness of a sphere.

In order to achieve the above objects, the present invention is characterized by being provided with a rotary drive mechanism which includes two rollers whose axes are arranged in parallel to support a sphere placed thereupon, and a rotary drive means which has a rotary drive motor used to drive said two rollers to rotate in identical directions at equal tangential velocities, in which a holding section for supporting the sphere is formed on one of said two rollers, and a pair of surfaces which make up the holding section face each other axially along the rollers and take the form of partial surfaces of spheres whose centers lie along the axis of rotation of the roller and whose diameters are equal to that of the roller.

Alternately, the instrument of the invention is preferably provided with a nose piece which includes a contact section which makes contact with an object to be measured and detects surface roughness, a detector arm which holds said contact section in its tip, a set of skids arranged in parallel on either side of said contact section which are in contact with the object to be measured along with the contact section when the contact section is arranged in contact with the object to be measured, a movable means which allows the set of skids to rock about the direction of extension of the detector arm as an axis.

Alternately, the movable means is preferably a leaf spring included between a mounting section for mounting to the surface roughness measuring instrument itself and a tip section.

Alternately, the movable means is preferably made up of ring-shaped bearings included between the mounting section for mounting to the surface roughness measuring instrument itself and the tip section, and a pivotal support member on which the bearings are pivotally supported.

Alternately, the rotary drive mechanism preferably includes a rotating plate which rotates by receiving driving torque from the rotary drive motor and can transmit driving torque to said two rollers through friction transmission, and a pressure adjusting means which is located near said rotating plate and is able to adjust the contact pressure at which the rotating plate maintains rolling contact with the two rollers.

Alternately, the surface roughness measuring instrument of the invention is characterized by being provided with a nose piece which includes a contact section which makes contact with an object to be measured and detects surface roughness, a detector arm which holds said contact section in its tip, a set of skids arranged in parallel on either side of said contact section which are in contact with the object to be measured along with the contact section when the contact section is arranged in contact with the object to be measured, a movable means which allows the set of skids to rock about the direction of extension of the detector arm as an axis.

BRIEF DESCRIPTION OF THE DRAWINGS

FIG. 10 is a view equivalent to FIG. 7 but in which the surface roughness of a sphere is measured using this preferred embodiment.

FIG. 11 is a view equivalent to FIG. 8 but in which the surface roughness of a sphere is measured using this preferred embodiment.

FIG. 12 is a cross section along XII—XII of FIG. 11.

FIG. 22 is a view equivalent to FIG. 6 but of the nose piece of an example of prior art.

FIG. 23 is a perspective view of the nose piece of an example of prior art.

FIG. 24 is a view equivalent to FIG. 8 but of an example of prior art.

DESCRIPTION OF THE PREFERRED EMBODIMENTS

The invention will now be described in detail based on the preferred embodiments illustrated in FIGS. 1-17. However, the invention is in no way limited by these preferred embodiments.

Figure 1:
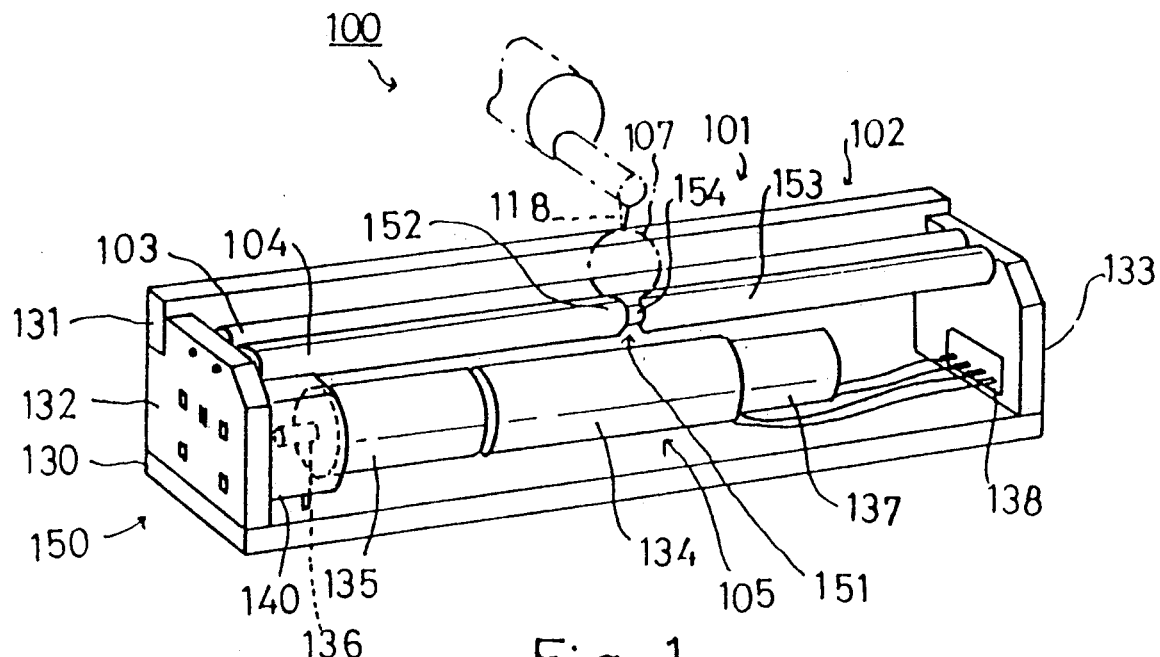
FIG. 1 is a perspective view of the rotary drive mechanism of a surface roughness measuring instrument of one preferred embodiment of the invention.

FIG. 1 shows the rotary drive mechanism of a surface roughness measuring instrument of one preferred embodiment of the invention. Note that parts with counterparts in the above description of an example of prior art will be given the same number to which 100 is added, and their explanation will be omitted.

The rotary drive mechanism 101 for a sphere shown in FIG. 1 has a roughly bench-shaped frame 102 formed of a bottom plate 130, back plate 131 and two roller support plates 132 and 133, one on each side. Two rollers 103 and 104 are arranged in parallel on the open top part of this frame 102. Each of these rollers 103 and 104 are rotatably supported at both ends by the roller support plates 132 and 133. The rotary drive mechanism 101 is also provided with an internal rotary drive motor 105 which, by rotating the rollers 103 and 104, rotates a sphere 107 placed in the space between them so that a tip contact section 118 of surface roughness measuring instrument 100 can be used to measure the surface roughness of the sphere 107 in the circumferential direction.

In this case, the rotary drive motor 105 is made up of a motor section 134 using an electric motor coaxially connected to a reduction gear mechanism 135 such that any desired torque can be generated at the output axle 136. A tachometer 137 is also connected to the motor section 134, and the motor section 134 and tachometer 137 are connected to a controller (not shown) through a connector 138 so that the speed of revolution of output axle 136 can be accurately controlled using feedback from the tachometer 137.

Figure 2:
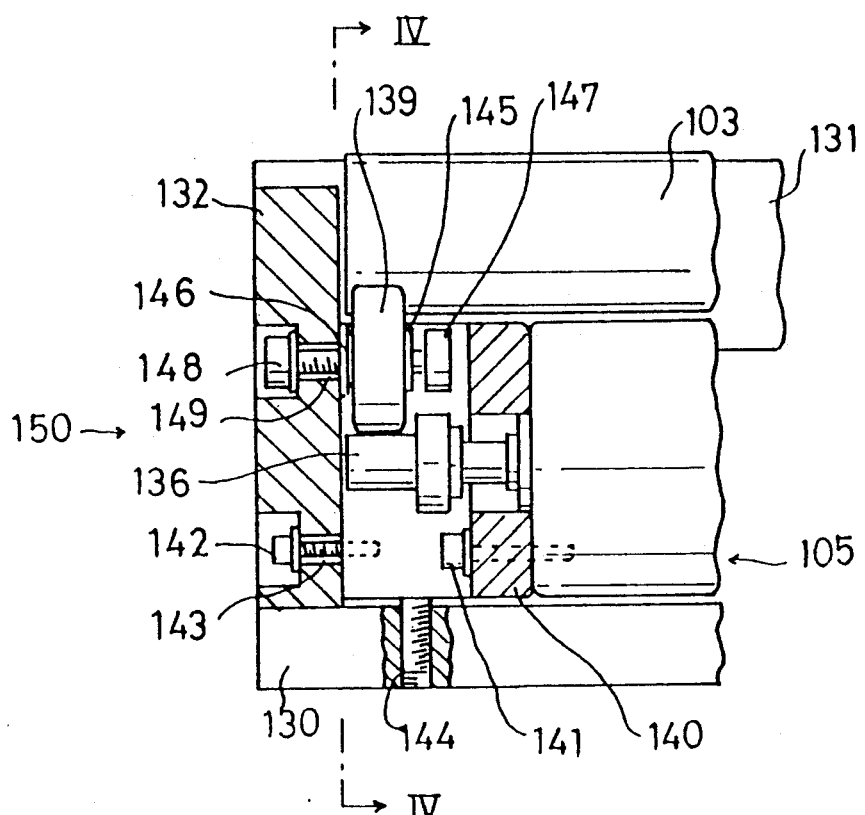
FIG. 2 is a cross section of a detail of the above preferred embodiment.
Figure 3:
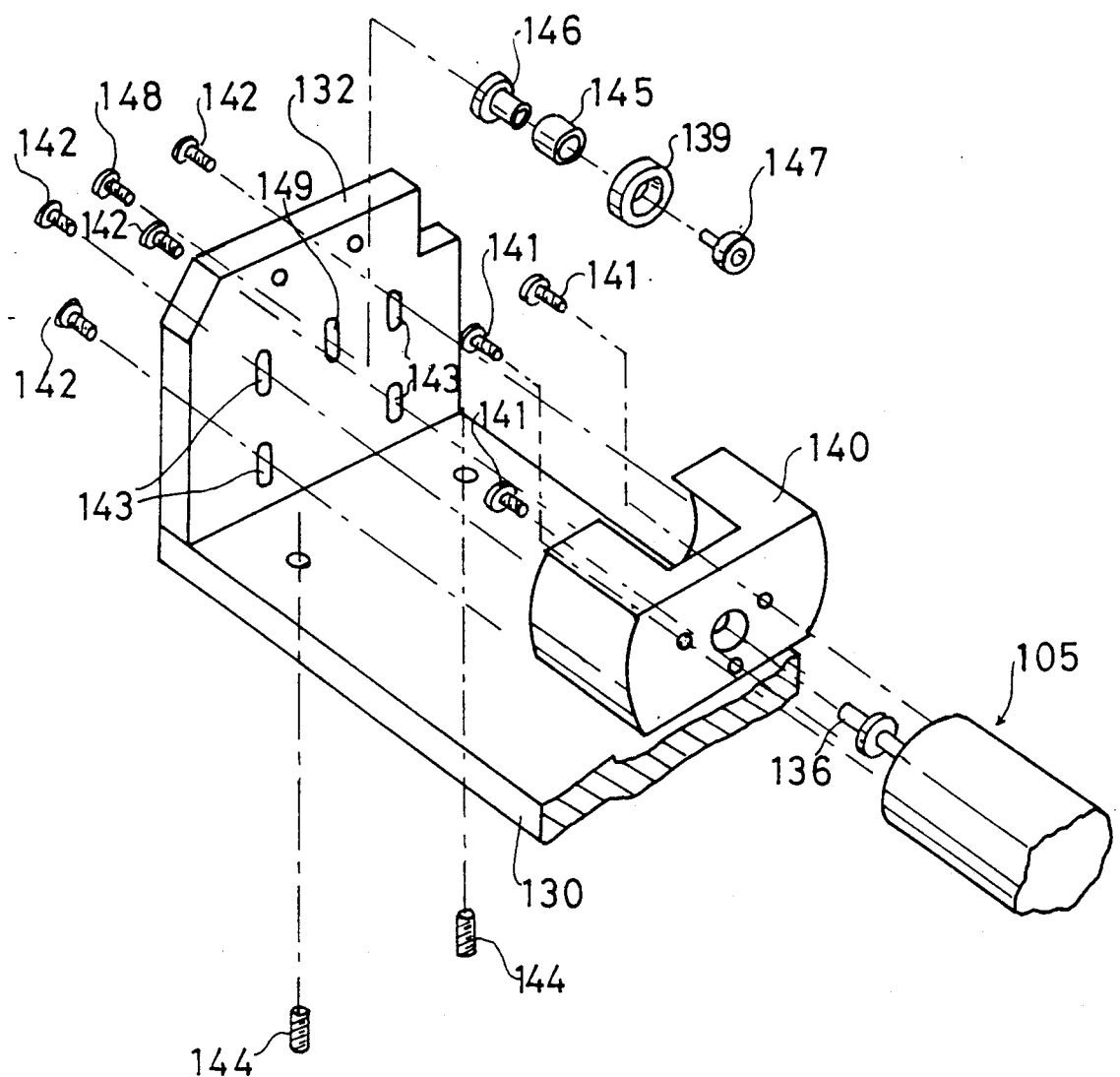
FIG. 3 is an exploded perspective view of a detail of the above preferred embodiment.

FIG. 2 is a cross section of a detail of the rotary drive mechanism 101 shown in FIG. 1, while FIG. 3 is an exploded perspective view of this detail.

As shown in FIGS. 2 and 3, the rotary drive mechanism 101 for a sphere is configured such that the output axle 136 fits against rotating plate 139 and its rotation is transferred by friction transmission, while this rotating plate 139 fits against rollers 103 and 104 and its rotation is also transferred by friction transmission. Furthermore, the rotary drive mechanism 101 for a sphere comprises means for adjusting the pressure at the contact portions in the engaged state so that the output axle 136 and rotating plate 139, and the rotating plate 139 and rollers 103 and 104, can attain rolling contact.

Specifically, the rotary drive motor 105 is attached to a bracket 140 and secured with machine screws 141. Note that this bracket 140, shaped roughly like a tube with its top and bottom removed, is attached to roller support plate 132 and secured with securing screws 142. Through holes 143 through which these securing screws 142 pass are formed as slotted holes in the vertical direction so that the bracket 140 can be fixed at any desired height.

Here a pair of adjusting screws 144 are screwed in through the bottom plate 130 to touch the bracket 140, so that by adjusting the length by which the screws protrude, the height at which bracket 140 is secured is adjustable.

The output axle 136 inserted within bracket 140 protrudes so that it is in rolling contact with rotating plate 139 rotatably arranged on roller support plate 132.

A hat screw 146 coaxially passes through rotating plate 139 via a bushing 145, while a stop screw 147 is screwed onto its tip to prevent rotating plate 139 from coming off. This hat screw 146 is attached to roller support plate 132 with a securing screw 148 which passes through the roller support plate 132 from the opposite side. The through hole 149 through which securing screw 148 passes is formed as a slotted hole in the vertical direction, and its width is slightly wider than securing screw 148, so the position at which rotating plate 139 is secured can be adjusted.

Figure 4:
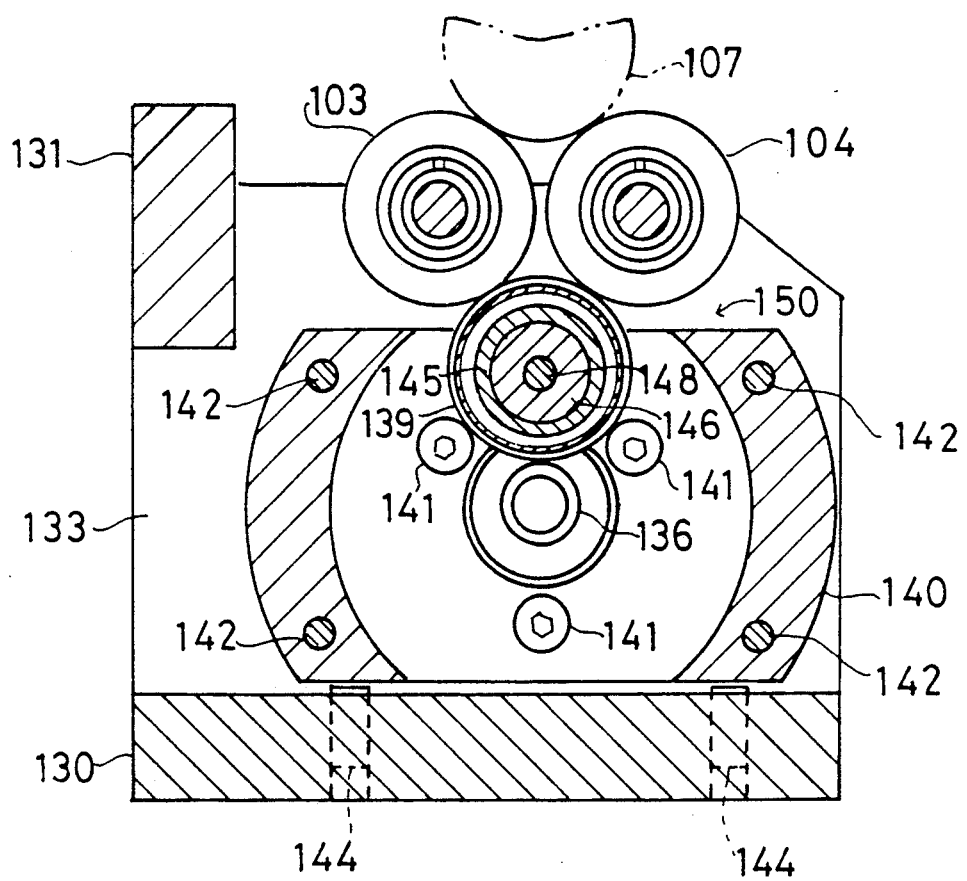
FIG. 4 is a cross section along line IV—IV of FIG. 2 above.
Figure 5:
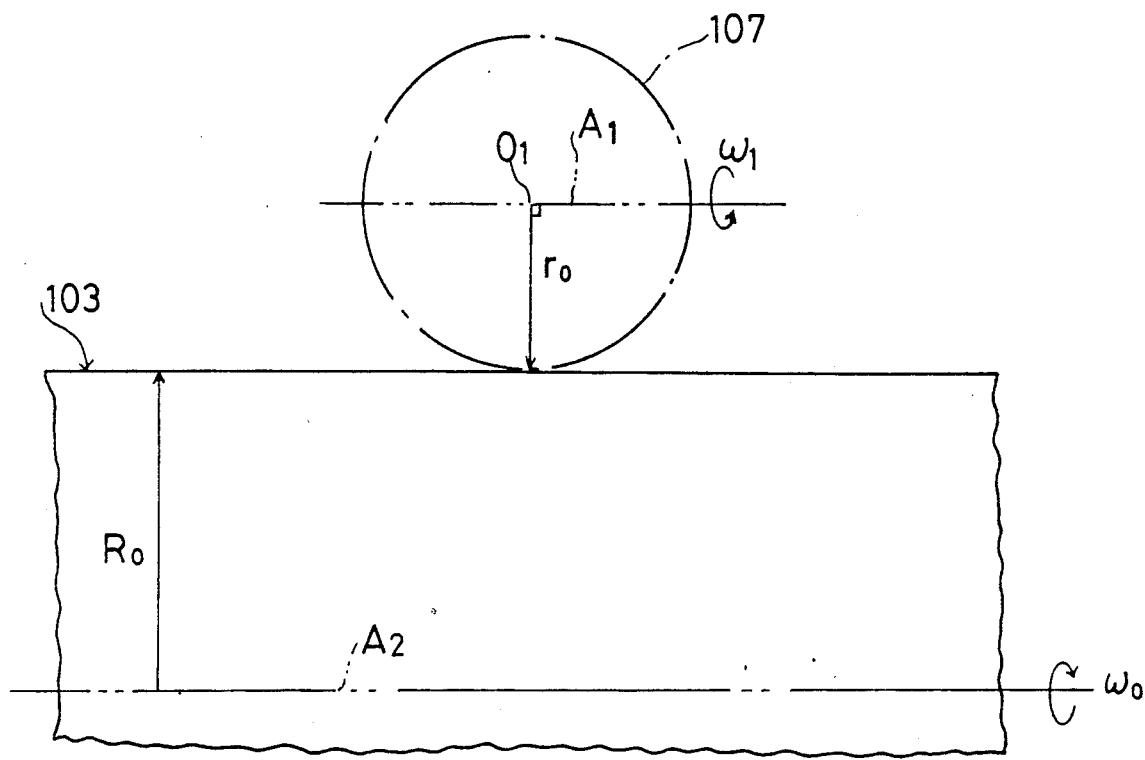
FIGS. 5(A) and 5(B) is a side view of a detail of the above preferred embodiment.
Figure 5:
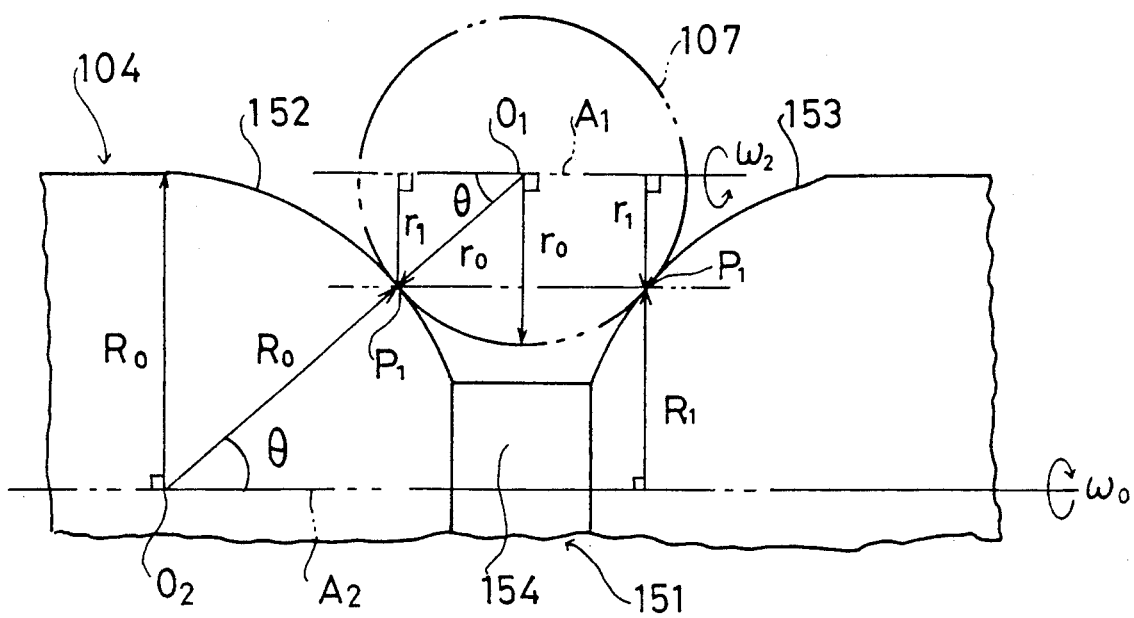

FIG. 4 is a cross section along line IV—IV of FIG. 2 above. As shown in the figure, in the rotary drive mechanism 101 for a sphere, the rotating plate 139 is arranged directly below the pair of rollers 103 and 104, and is secured such that it is in equal rolling contact with the cylindrical surfaces of rollers 103 and 104, so the torque transferred from output axle 136 of rotary drive motor 105 is equally transferred synchronously to both rollers 103 and 104 so that both rollers 103 and 104 rotate at equal tangential velocities, thus comprising a synchronous drive means 150.

Furthermore, in the rotary drive mechanism 101 for a sphere, as shown in FIG. 1, a holding section 151 into which the sphere 107 can be fit is formed on the roller 104. This holding section 151 comprises two contact surfaces 152 and 153 having partially spherical surfaces arranged facing each other and a small-diameter connector section 154 which connects the two surfaces. Therefore, sphere 107 is supported at three points, one point on roller 103 and two points on the holding section 151 of roller 104, so a sphere 107 placed on holding section 151 can be rotated by the rollers 103 and 104 which are synchronously rotated by the synchronous drive means 150, but is held between the contact surfaces 152 and 153 so that its movement along rollers 103 and 104 is limited.

FIG. 5(A) shows the state of sphere 107 as placed on roller 103, while FIG. 5(B) shows the state of sphere 107 as placed on roller 104. As is clear from FIG. 5(B), the contact surfaces 152 and 153 of holding section 151 are partial spheres in shape and the spherical radius $R_0$ of each of the partially spherical surfaces are equal to the radius of roller 104, and the center $O_2$ of each sphere lies upon the axis of rotation of roller 104. Thus the perimeters of contact surfaces 152 and 153 are smoothly connected to the cylindrical surface of roller 104, and a sphere 107 placed on the holding section 151 will be in constant contact with each of the contact surfaces 152 and 153.

Here follows an explanation of the function of a rotary drive mechanism 101 for a sphere.

First of all, a sphere 107 is placed on rollers 103 and 104 so that it is supported at a total of three points: one point on roller 103 and two points on holding section 151 of roller 104. Since the placement of the sphere 107 is stable due to its three-point suspension, it is able to rotate in the circumferential direction of rollers 103 and 104 but its movement in the axial direction is limited by the holding section 151 of roller 104, so any motion of sphere 107 rolling back and forth along rollers 103 and 104 will not occur. Next, the synchronous drive means 150 will begin operating and the rotating plate 139, being in rolling contact with the output axle 136 of rotary drive motor 105, will begin to rotate, driving the pair of rollers 103 and 104 in rolling contact with rotating plate 139 to simultaneously rotate at equal tangential velocities. The rollers 103 and 104 driven to rotate at equal tangential velocities will each provide driving torque to the sphere 107.

As shown in FIG. 5(A), the point at which the sphere 107 is supported by roller 103 receives driving torque at the above tangential velocity moving in a circle of a radius equal to the radius $r_0$ of the sphere 107. So if the angular velocities of rollers 103 and 104 are both equal to $\omega_0$, their tangential velocity is given as $V_0$ and the radius of the sphere 107 as $r_0$, the sphere 107 will be driven to rotate so that the angular velocity of a great circle on its surface of radius $r_0$ perpendicular to its axis of rotation $A_1$ becomes $\omega_1 V_0/r_0$.

On the other hand, the points at which the sphere 107 is supported by roller 104 receive driving torque at a tangential velocity corresponding to that of the points on the partially spherical surface of holding section 151 at which sphere 107 is supported, rather than the above tangential velocity. This torque acts in a circle of a radius equal to the distance connecting the point of contact and the axis of rotation $A_1$ of the sphere 107. Taking $\theta$ to be the angle at which the line segment N connecting the center of curvature $O_2$ of partial spherical surface of holding section 151 and the center $O_1$ of sphere 107 meets the axis of rotation $A_2$ of roller 104, the sphere 107 makes contact with contact surface 152 (153) at a point of contact $P_1$, and the radius of rotation $r_1$ of this point of contact $P_1$ is expressed by the following equation.

$$r_1 = r_0 \cdot \sin\theta$$

The radius of rotation $R_1$ of the point of contact $P_1$ on the roller 104 side is expressed by the following equation.

$$R_1 = R_0 \cdot \sin\theta$$

Therefore, if roller 104 rotates at an angular velocity $\omega_0$, the tangential velocity $V_1$ at point of contact $P_1$ is expressed by the following equation.

$$V_1 = R_1 \cdot \omega_0 = R_0 \cdot \sin\theta \cdot \omega_0$$

As a result, the tangential velocity of sphere 107 is also $R_0 \cdot \sin\theta \cdot \omega_0$, and its angular velocity $\omega_2$ is expressed by the following equation.

$$\begin{aligned}\omega_2 &= R_0 \cdot \sin\theta \cdot \omega_0/r_1 \\ &\quad R_0 \cdot \sin\theta \cdot \omega_0/(r_0 \cdot \sin\theta) \\ &\quad \omega_0 \cdot R_0/r_0 = V/r_0 = \omega_1\end{aligned}$$

From the above equation, it can be seen that the sphere 107 is driven to rotate at equal speeds at the point at which it is supported by roller 103 and at the points at which it is supported by roller 104 at the holding section 151. Therefore, the sphere 107 will rotate stably at the desired speed, providing no hindrance to the measurement of the surface roughness of the sphere 107. The measurer is able to find the surface roughness of the sphere 107 rotating stably at the desired speed with a measuring instrument 100 based on detection from tip contact section 118.

The present preferred embodiment as described above has the following advantages.

By forming a holding section on one roller 104, of the rollers 103 and 104 onto which a sphere 107 is placed, the sphere 107 is held between a pair of contact surfaces 152 and 153 and thus supported at two points to limit its movement in directions perpendicular to this mating direction, specifically the axial direction of roller 104, so the sphere 107 will be maintained in a specified position and the problem of the sphere moving in the axial direction of rollers 103 and 104 will not occur.

Furthermore, by forming the two opposing surfaces which make up holding section 151 as partial surfaces of spheres whose centers lie on the axis of revolution of roller 104 and whose diameters are equal to that of roller 104, and by arranging rollers 103 and 104 such that they rotate at equal tangential velocities, a sphere 107 placed on and driven to rotate by rollers 103 and 104 will, regardless of the tangential velocity of rollers 103 and 104 or the radii of rollers 103 and 104, receive driving torque of equal angular velocity from both rollers 103 and 104. Therefore, sphere 107 will rotate stably at the desired speed and provide no hindrance to the measurement of the surface roughness of the sphere 107.

Note that the pair of rollers 103 and 104 can be rotated at equal tangential velocities by the synchronous drive means 150 which contains a rotating plate 139 which is in rolling contact with each of the rollers 103 and 104 and a rotary drive motor 105.

Furthermore, since the angular velocity of sphere 107 is automatically matched by rollers 103 and 104, there is no need to provide contact grooves, etc., on each of the two rollers as is conventionally done. There is also no need for such adjustments as matching of the grooves on both rollers, so manufacture can be simplified.

In addition, since the rollers 103 and 104 are formed as a pair of rods extending in parallel, a solid or hollow cylinder or other cylindrical body of revolution may be placed in the space between them along each and the surface roughness of its peripheral surface may be measured so the present invention also has wide application in surface measurement of objects other than spheres.

Since rolling contact is employed in the synchronous drive means 150, in the transfer of rotation from the output axle 136 of rotary drive motor 105 to rotating plate 139 and on to rollers 103 and 104, the transfer of rotation is smooth and the occurrence of play or unevenness in rotation can be reduced to allow precise rotary feed operations. Therefore the accuracy of synchronization of measured data with angular position in a surface roughness measuring instrument can be improved to obtain high-precision measurement results.

Since the cylindrical surfaces of rollers 103 and 104 are driven by rolling contact with rotating plate 139, the tangential velocity of both rollers 103 and 104 are automatically matched, so there is no limit to the radii of rollers 103 and 104 and thus the invention is applicable to the measurement of a wide range of spheres 107.

Note that the cylindrical surfaces of rollers 103 and 104 and contact surfaces 152 and 153, along with the parts of the rotating plate 139, output axle 136 of rotary drive motor 105 and other parts in rolling contact may be coated with a material with an appropriately large friction coefficient, or sheets of material may be applied to increase the torque transmitted and achieve more reliable and accurate rotary driving.

The axle supports for rotating plate 139 and rollers 103 and 104 may also be appropriately fitted with ball bearings or the like to decrease resistance to rotation and improve the smoothness of the rotary motion.

The synchronous drive means 150 is also not limited to one using a rotating plate 139 and rotary drive motor 105 as described in the above preferred embodiment, but rather as long as it is of a structure in which a pair of rollers 103 and 104 can be synchronously driven, any suitable mechanism or the like may be employed in its practical use.

As to the radial dimensions, length and materials for rollers 103 and 104, the rotating plate 139, output axle 136 and other parts, they may be selected as necessary, while the ratings and type of the rotary drive motor 105, form and material for the frame 102 and other items may be appropriately selected depending upon its practical use.

In particular, the external diameter of rollers 103 and 104 can be changed at any time during measurement work, and the two rollers 103 and 104 may be of different external diameters so as long as the rollers 103 and 104 are in firm contact, their tangential velocities will be automatically matched due to a common rotating plate 139 so the sphere 107 will be stably driven at all times.

In the previous preferred embodiment, the rollers 103 and 104 are both rod-shaped and a holding section 151 is formed in the center of one, roller 104, with two hemispheric contact surfaces 152 and 153 facing each other, but the roller 104 and contact surfaces 152 and 153 may be formed of other means.

For example, two spheres of equal radii linked by a small-diameter connector section 154, forming a roller 104 shaped like a hand barbell, may be arranged such that the axis line connecting the centers of the two spheres is parallel to roller 103. With such a roller 104, the hemispheric surfaces of the two spheres facing each other form a pair of contact surfaces 152 and 153. In this case, the centers of curvature of these contact surfaces 152 and 153 are naturally the centers of the two spheres, so the radii of curvature of contact surfaces 152 and 153 are equal to the radii of the spheres and consequently the radius of a roller 104 formed by an imaginary cylindrical surface enveloping both spheres. Therefore, by driving the two spheres which make up roller 104 at the same tangential velocity as roller 103, nearly the same effect as in the previous preferred embodiment can be obtained so that the sphere 107 can be stably driven. While unsuitable for long rod-shaped members, the instrument could be made more compact if specialized for the measurement of short cylindrical bodies of revolution or spheres 107.

Figure 6:
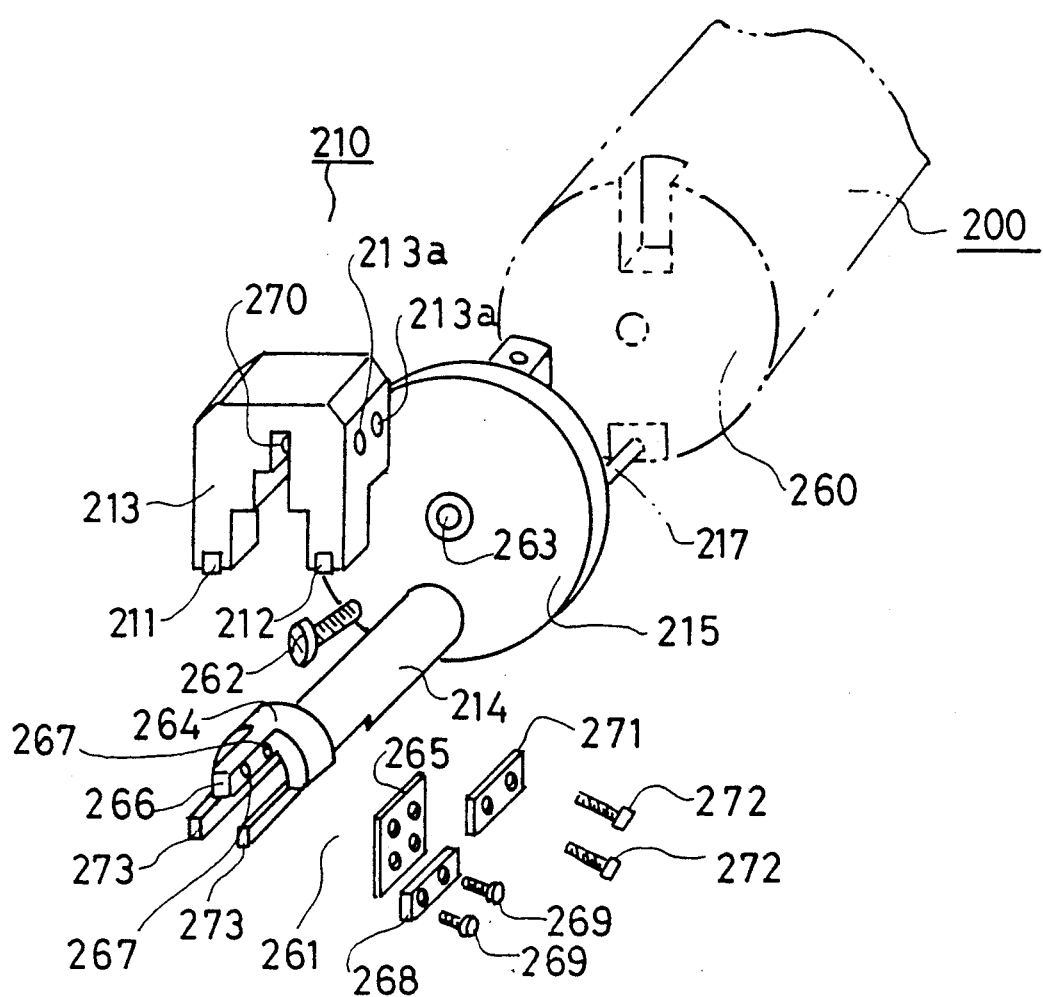
FIG. 6 is an exploded perspective view of the nose piece of the surface roughness measuring instrument of one preferred embodiment of the invention.

FIG. 6 is an exploded perspective view of the nose piece of the surface roughness measuring instrument of one preferred embodiment of the invention.

The nose piece 210 of a surface roughness measuring instrument shown in FIG. 6 includes a mounting member 215 mounted on the front surface 260 of the surface roughness measuring instrument 200, skids 211 and 212, a holder 213 which is the tip section and acts to support skids 211 and 212 in a parallel state, and a movable means 261 placed between the mounting member 215 and the holder 213 to enable the holder 213 to rock with respect to the mounting member 215.

The mounting member 215 is provided with a through hole 263 through which passes a machine screw 262 for securing the mounting member 215 to the surface roughness measuring instrument 200, and a protector 214 which covers and protects the detector arm 217 of the surface roughness measuring instrument 200.

The movable means 261 comprises a support member 264 which is attached and secured to the tip of protector 214 and yet supports the rocking of holder 213, a leaf spring 265, internal threads 267, presser bar 268 and tap screws 269 for attaching the leaf spring 265 to a support 266 of the support member 264, and internal threads 270, presser bar 271 and tap screws 272 for attaching the leaf spring 265 to the holder 213. Note that the movable means 261 is provided with limiters 273 on both sides of the tip of the protector 214 for limiting the range of movement of the holder 213 with respect to the mounting member 215. The holder 213 is also provided with through holes 213a through which the working tip of a screwdriver can pass when screwing the tap screws 272 into the internal threads 270.

Figure 7:
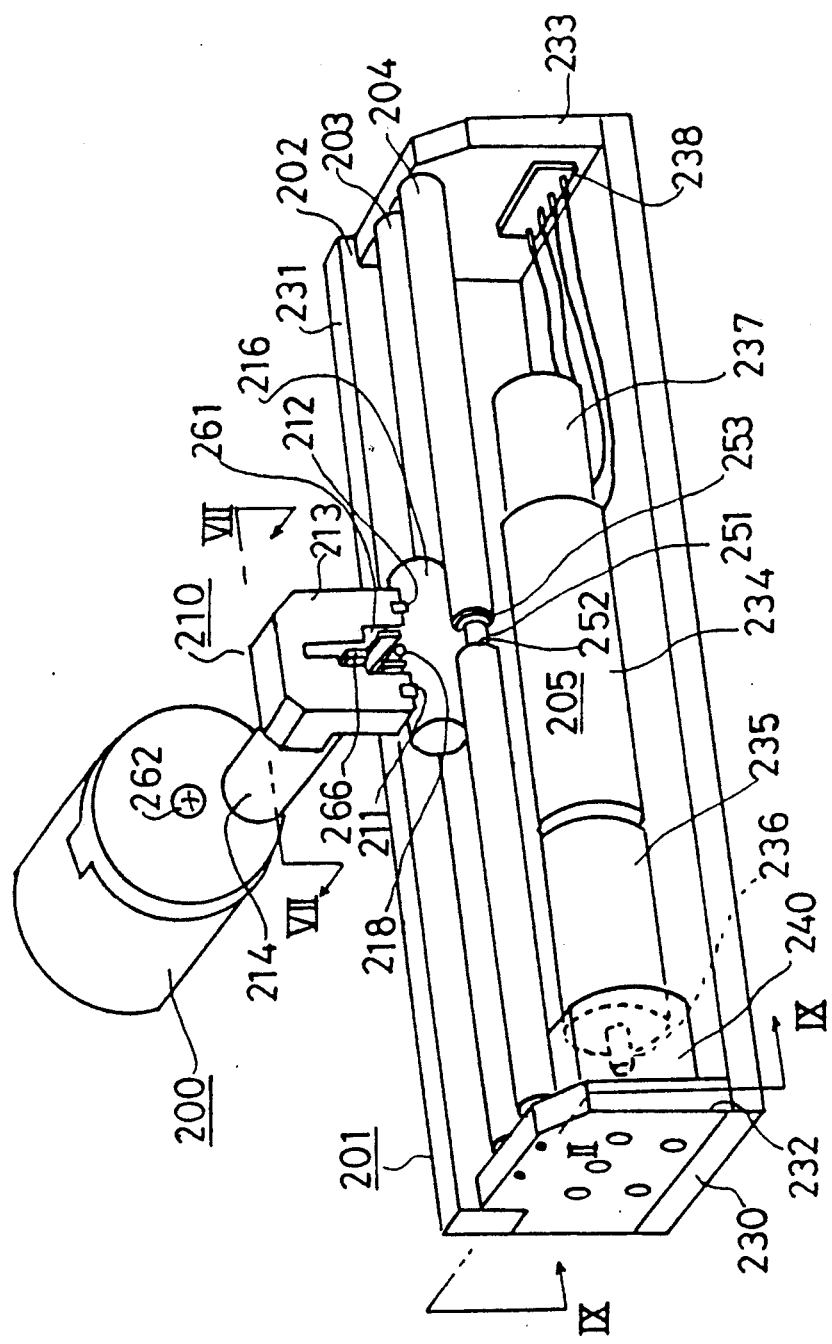
FIG. 7 is a perspective view in which the surface roughness of a round rod is measured using this preferred embodiment.
Figure 8:
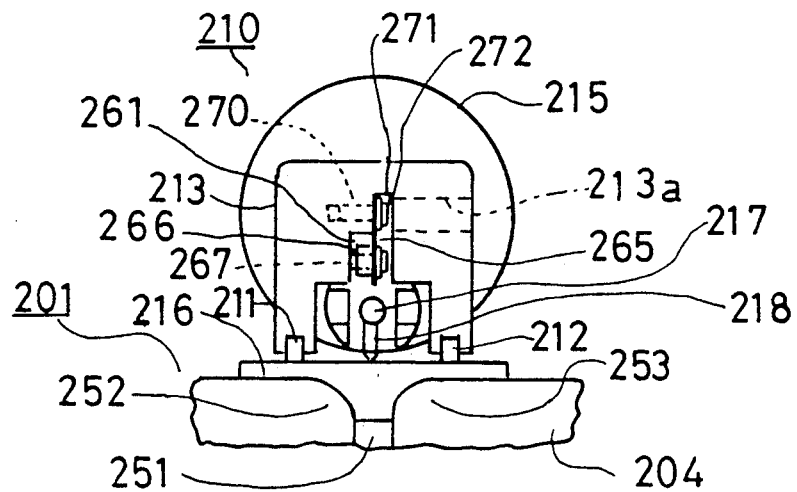
FIG. 8 is a view of detail VII—VII of FIG. 7.
Figure 9:
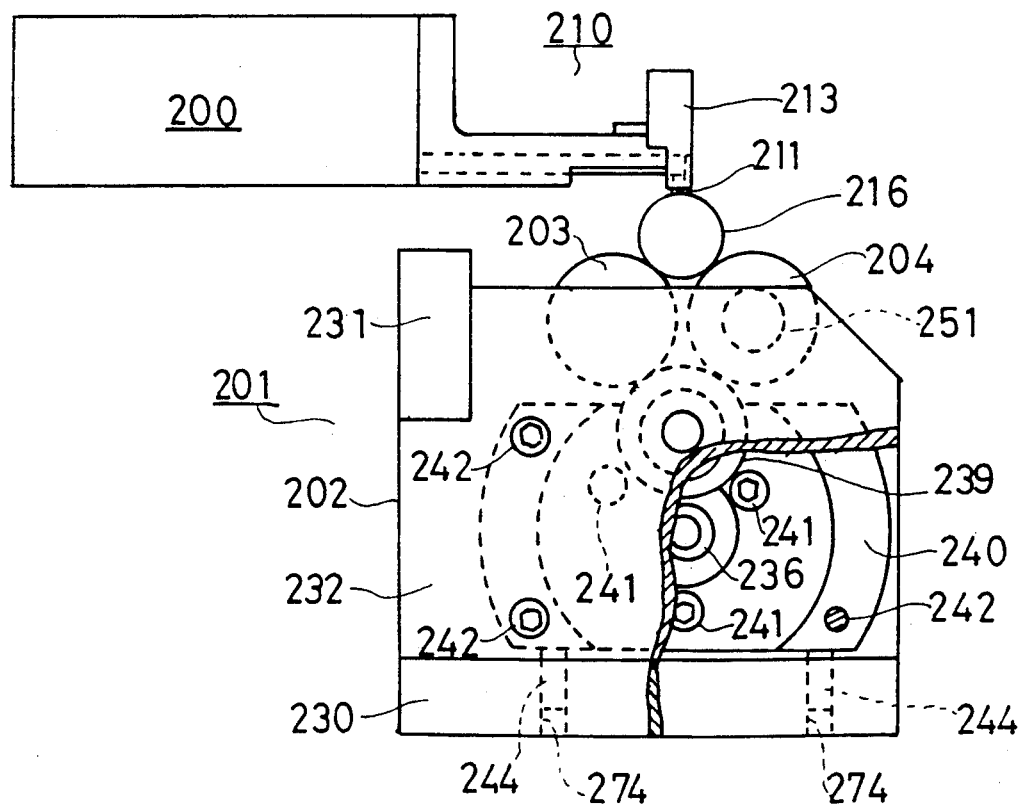
FIG. 9 is a partial cutaway view of detail IX—IX of FIG. 7.

Here follows a description of the action of the nose piece 210 of the surface roughness measuring instrument with reference to FIGS. 7 through 9.

Note that FIG. 7 is a perspective view in which the surface roughness of a round rod is measured with a surface roughness measuring instrument which uses the nose piece shown in FIG. 6. FIG. 8 is a view of detail VII—VII of FIG. 7. FIG. 9 is a partial cutaway view of detail IX—IX.

When measuring the surface roughness of a body of revolution, namely a round rod 216, in the circumferential direction, first the nose piece 210 of the surface roughness measuring instrument is attached to the surface roughness measuring instrument 200 and secured with the machine screw 262. The round rod 216 is placed on the rotary drive mechanism 201 and the surface roughness measuring instrument 200 is arranged so that the tip contact section 218 of the detector arm 217 is in contact with the round rod 216 in that state. At this time, skids 211 and 212 touch the round rod 216 on either side of the location to be measured.

Note that as in FIGS. 7 and 9, the rotary drive mechanism 201 comprises a frame 202 formed of a bottom plate 230, back plate 231 and roller support plates 232 and 233 onto which two rollers 203 and 204 are rotatably arranged in parallel. The rotary drive mechanism 201 is provided with a rotary drive motor 205 which includes a motor section 234, reduction gear mechanism 235 and tachometer 237; a rotating plate 239 able to transmit the driving torque of rotary drive motor 205 from the output axle 236 of the rotary drive motor 205 to the rollers 203 and 204 by means of friction transmission through rolling contact; and a means of adjusting the contact pressure which the rotating plate 239 exerts on the two rollers 203 and 204 for rolling contact, comprising internal thread holes 274 provided on the bottom plate 230, adjusting screws 244 which screw into the internal thread holes 274 and a bracket 240 unitized with the rotary drive motor 205 and which is able to determine the height position of the rotary drive motor 205. Note that machine screws 241 are provided to maintain the rotary drive motor 205 and bracket 240 as a unit. Other machine screws 242 are also provided to secure the bracket 240 in its determined height position.

Additionally, a holding section 251 is formed on roller 204 of the rotary drive mechanism 201. This holding section 251 comprises contact surfaces 252 and 253 formed as partial surfaces of spheres whose centers are located along the axis of rotation of roller 204 and whose diameters are equal to that of roller 204.

The rotary drive motor 205 is connected to a power source and controller (both not shown) through a connector 238, causing the rotary drive motor 205 to generate power. When the rotary drive motor 205 rotates, its driving torque is transferred to rollers 203 and 204 through rotating plate 239. The round rod 216 is driven to rotate by the rollers 203 and 204 so that the round rod 216 rotates in the circumferential direction with the tip contact section 218 of the detector arm 217 of the surface roughness measuring instrument 200 in contact, and thus the surface roughness of the round rod 216 in the circumferential direction is measured. During this measurement, if the cross-sectional shape of rollers 203 and 204 are not actually perfect circles, the rollers 203 and 204 do not actually rotate in perfect circles, the cross-sectional shape of round rod 216 is not actually a perfect circle in shape or other irregularities occur, the round rod 216 will begin to rock in the direction of the axis of rotation as described above. If this rocking is, for example, movements in which the left side of the round rod 216 as seen in FIG. 8 drops and the right side rises, the round rod 216 will separate from skid 211 while being pushed by skid 212 with greater force. Yet the pressure from the round rod 216 which pushes skid 212 nearly straight up finds resistance in the elastic force of leaf spring 265 which tends to rotate holder 213 about its support 266 in the counterclockwise direction as seen in FIG. 8. When the holder 213 is rotated in counterclockwise direction as seen in FIG. 8, the skid 212 supported by the holder 213 will also similarly rotate about support 266 in the counterclockwise direction as seen in FIG. 8 so skid 211 is able to maintain its state of contact with the round rod 216. Therefore, even if the round rod 216 rocks, skids 211 and 212 will continue to maintain their contact with the round rod 216 on either side of the location to be measured. Thus since the skids 211 and 212 act to maintain the tip contact section 218 of the detector arm 217 in an essentially fixed position relative to the round rod 216, the tip contact section 218 will measure only the surface roughness of the round rod 216. The value of surface roughness measured will be converted to an electrical value by differential transformers and the like within the main surface roughness measuring instrument 200 and provided as output on the display side.

The rocking of round rod 216 described above referred to the case of the left side of the round rod 216 as seen in FIG. 8 dropping and the right side rising, but even in the case of the right side of the round rod 216 as seen in FIG. 8 dropping and the left side rising, the skid 211 will be pushed by round rod 216 and the holder 213 will rotate about support 266 of support member 264 in the clockwise direction as seen in FIG. 8 so that skids 211 and 212 will continue to maintain their contact with the round rod 216 on either side of the location to be measured.

Even if rocking would occur in the direction of the axis of rotation of the round rod 216 to be measured, the tip contact section 218 of detector arm 217 will maintain an essentially fixed position relative to the round rod 216 so the tip contact section 218 will measure only the surface roughness of the round rod 216 and thus the measurement will contain no errors due to rocking of the round rod 216.

Here follows an explanation of measuring the surface roughness of a sphere 207 based on FIGS. 10 through 12. Sphere 207 is placed on roller 203 and the holding section 251 of roller 204 of the rotary drive mechanism 201. Next, when power is supplied to rotary drive motor 205 via a connector 238, the rotary drive motor 205 turns so that the output axle 236, via rotating plate 239, causes rollers 203 and 204 to rotate at equal tangential velocities. Since the sphere 207 will be driven by the mechanism described above to rotate at equal angular velocities at both the location at which it is supported by roller 203 and the holding section 251 of roller 204, the sphere 207 will rotate stably.

If while the sphere 207 is rotating, rocking begins to occur centered about, for example, the location on contact surfaces 252 and 253 of holding section 251 at which the sphere 207 is supported, in a manner similar to the rocking of a round rod 216 described above, the force beginning to rock the sphere 207 will push on skid 212. This pushing of skid 212 will cause holder 213 to rotate about support 266 of support member 264 in the counterclockwise direction as seen in FIG. 12 so that skid 211 will be pushed toward the sphere 207 by the rotation of holder 213 and thus follow sphere 207 and continue to maintain contact. If rocking begins to occur centered about the location on contact surfaces 252 and 253 of holding section 251 at which the sphere 207 is supported, by the same action of movable means 261, the skid 212 will also follow the sphere 207 and continue its contact. Therefore, even if rocking occurs in the direction of the axis of rotation away from the initial state, the tip contact section 218 of detector arm 217 will maintain an essentially fixed position relative to the round rod 216 so the tip contact section 218 will measure only the surface roughness of the round rod 216 and thus the measurement will contain no error due to rocking of the sphere 207.

Figure 13:
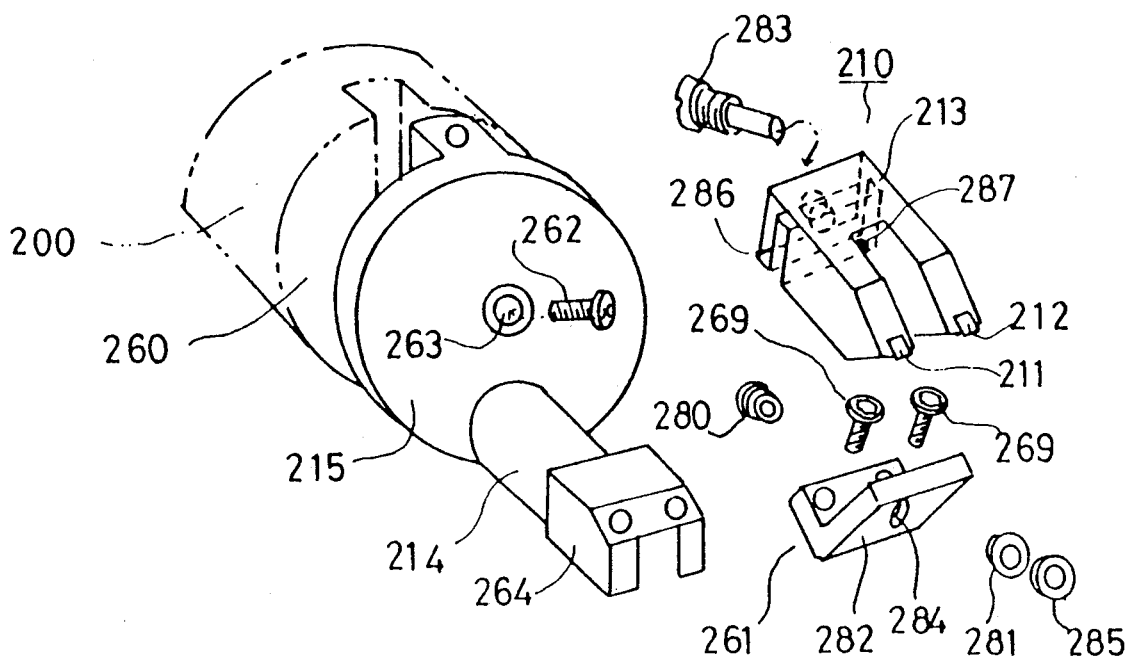
FIG. 13 is a view equivalent to FIG. 6 but of another preferred embodiment of the invention.
Figure 14:
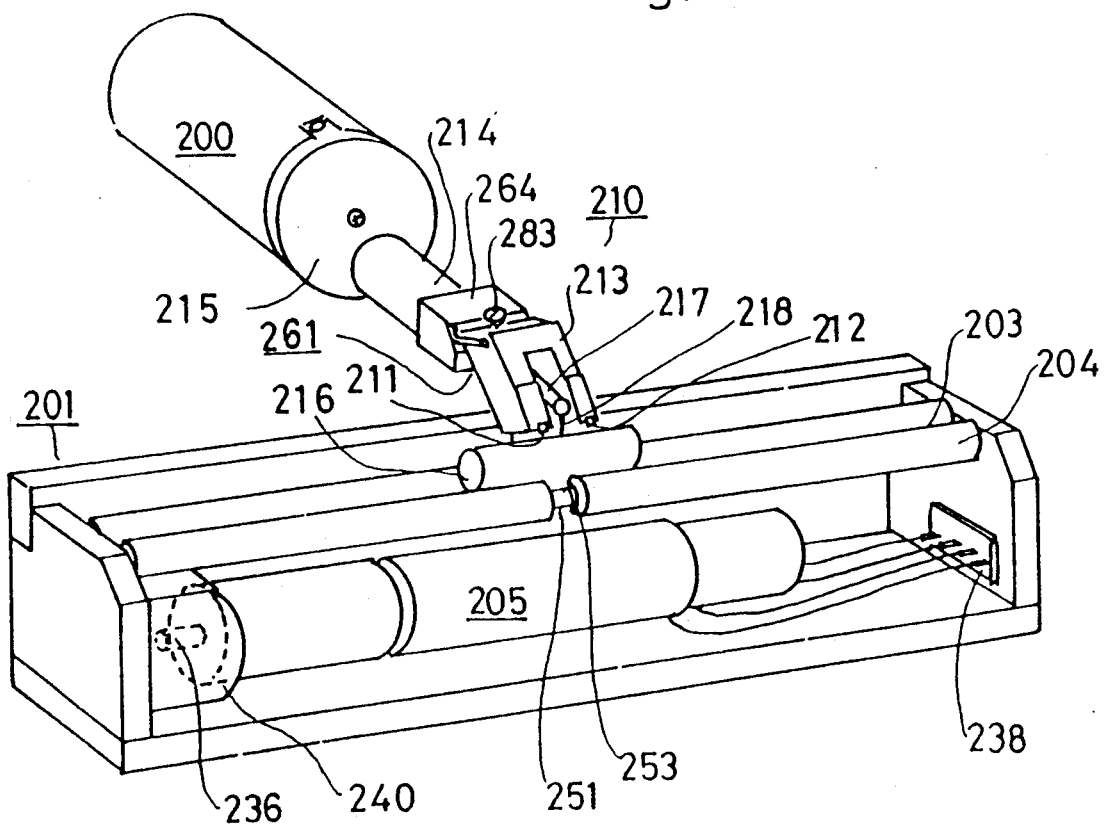
FIG. 14 is a view equivalent to FIG. 7 but of another preferred embodiment.
Figure 15:
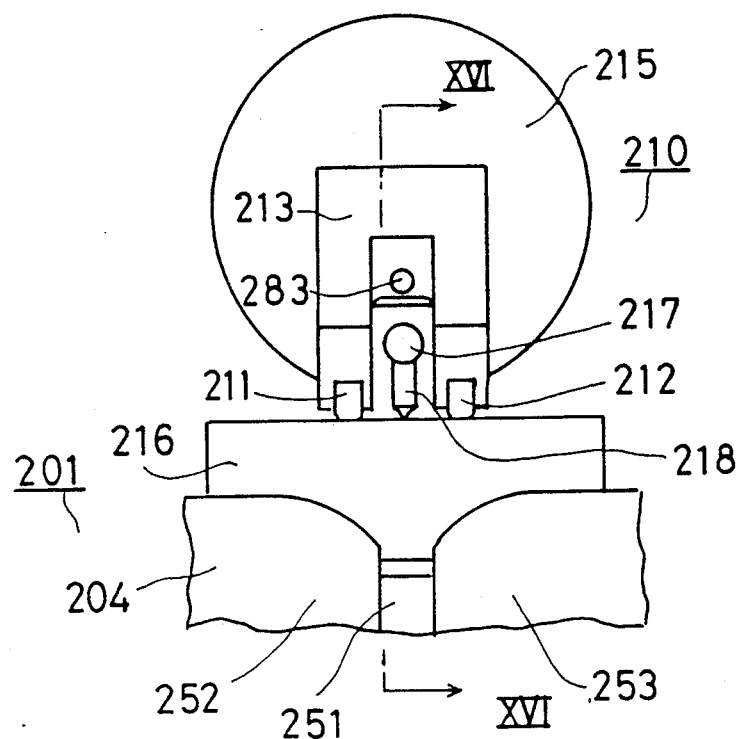
FIG. 15 is a view equivalent to FIG. 8 but of another preferred embodiment.
Figure 16:
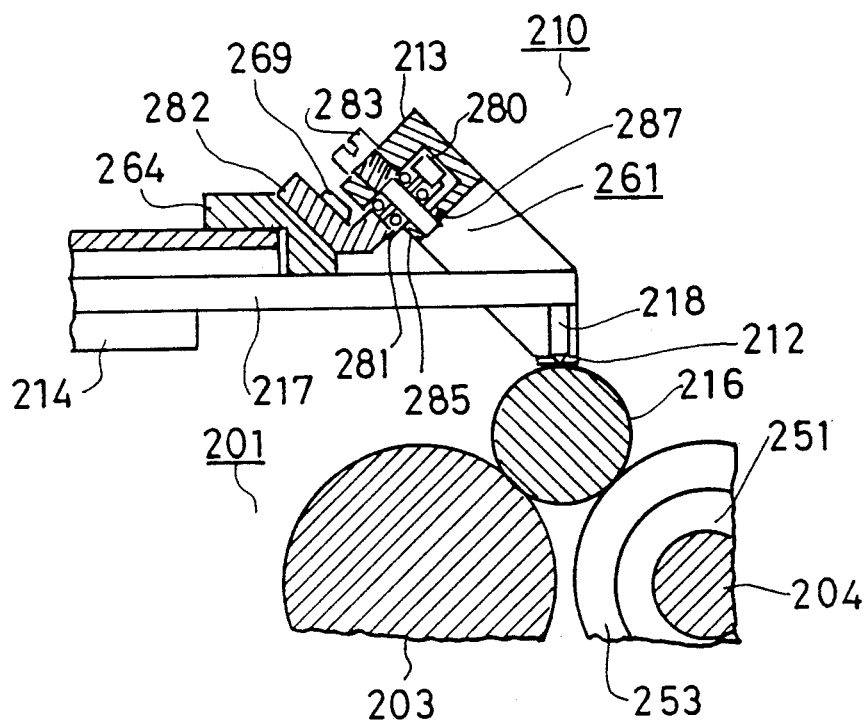
FIG. 16 is a partial cutaway view of detail XVI—XVI of FIG. 15.

Here follows an explanation of another preferred embodiment of the invention based on FIGS. 13 through 17. The nose piece 210 of a surface roughness measuring instrument, as shown in FIG. 13, includes a mounting member 215 mounted on the front surface 260 of the surface roughness measuring instrument 200, skids 211 and 212, a holder 213 which is the tip section and acts to support skids 211 and 212 in a parallel state, and a movable means 261 placed between the mounting member 215 and the holder 213 to enable the holder 213 to rock with respect to the mounting member 215.

The mounting member 215 is provided a with through hole 263 through which passes a machine screw 262 for securing the mounting member 215 to the surface roughness measuring instrument 200, and a protector 214 which covers and protects the detector arm 217 of the surface roughness measuring instrument 200.

The movable means 261 is comprised principally of a support member 264 which is attached and secured to the tip of protector 214 of mounting member 215 and supports the rocking of holder 213, bearings 280 and 281, a holding member 282 which is attached and secured to the support member 264 and to which bearings 280 and 281 are mated and held, and a pivotal support member 283 which is screwed onto the holder 213 and on which the bearings 280 and 281 are pivotally supported. The movable means 261 is assembled by using machine screws 269 to attach and secure the holding member 282 to the support member 264, mating the bearings 280 and 281 with the through hole 284 in holding member 282 from opposite directions, fitting the holding member 282 into a cutout 286 in holder 213 with a washer 285 in contact with bearing 281, pushing pivotal support member 283 through bearings 280 and 281 and hole 287 in the holder 213 and then attaching it to the holder 213 by threading.

Here follows an explanation of the use of the nose piece 210 of the surface roughness measuring instrument. When measuring the surface roughness of a body of revolution, namely a round rod 216, in the circumferential direction, first the nose piece 210 of the surface roughness measuring instrument is attached to the surface roughness measuring instrument 200 and secured with the machine screw 262. The round rod 216 is placed on the rotary drive mechanism 201 and the surface roughness measuring instrument 200 is arranged so that the tip contact section 218 of the detector arm 217 is in contact with the round rod 216 in that state (See FIGS. 14 and 15). At this time, skids 211 and 212 touch the round rod 216 on either side of the location to be measured. In this case, when power is supplied to rotary drive motor 205 via a connector 238, the rotary drive mechanism 201 is activated and the rollers 203 and 204 drive the round rod 216 to rotate in the circumferential direction. This rotation allows the surface roughness of the cylindrical surface of round rod 216 to be measured. If during this measurement, rocking of the round rod 216 begins to occur as in the previous preferred embodiment, the force from the one skid of skids 211 and 212 onto which greater pressure is applied will cause the holder 213 to rotate about the pivotal support member 283 toward the skid on the side on which pressure is not acting. Therefore, the skids 211 and 212 will continue to maintain their contact with the round rod 216 on either side of the location to be measured Thus, the tip contact section 218 of detector arm 217 will maintain an essentially fixed position relative to the round rod 216 so the tip contact section 218 will measure only the surface roughness of the round rod 216 and thus the measurement will contain no errors due to rocking of the round rod 216.

Figure 17:
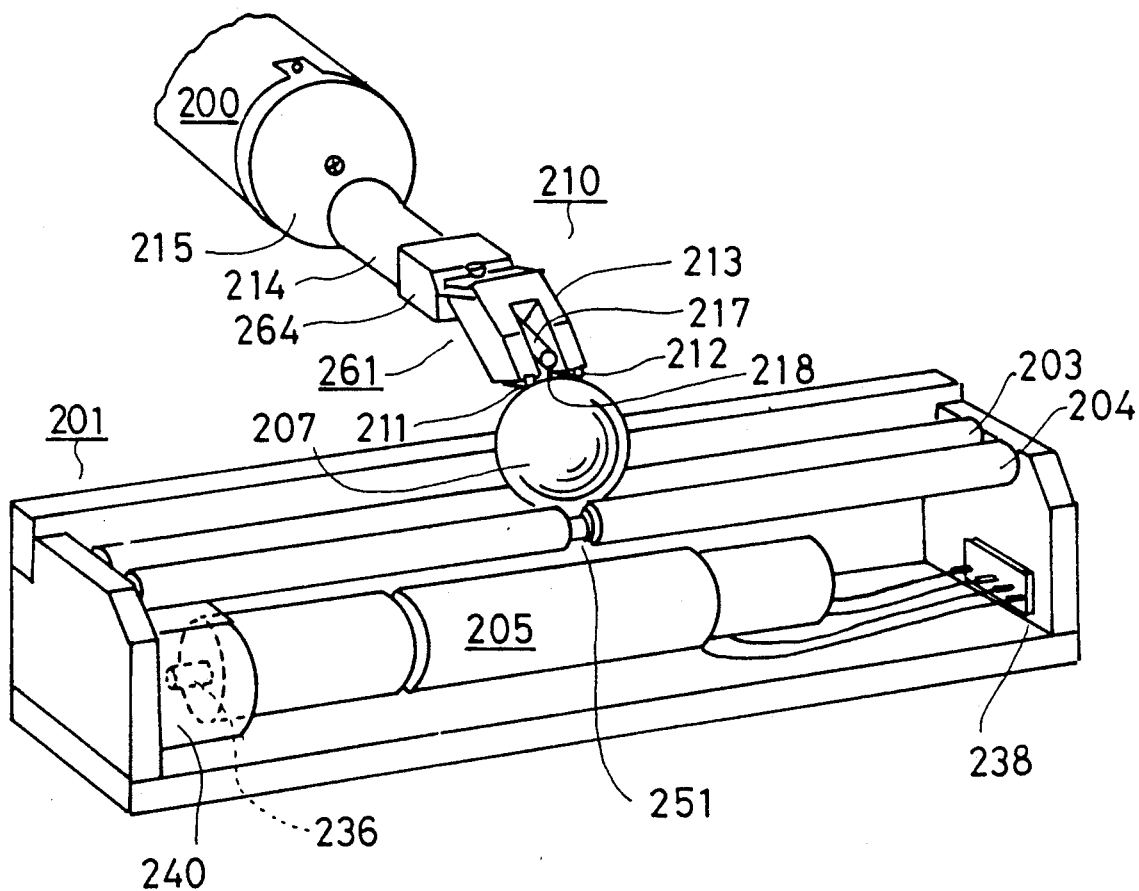
FIG. 17 is a view equivalent to FIG. 10 but of another preferred embodiment.
Figure 18:
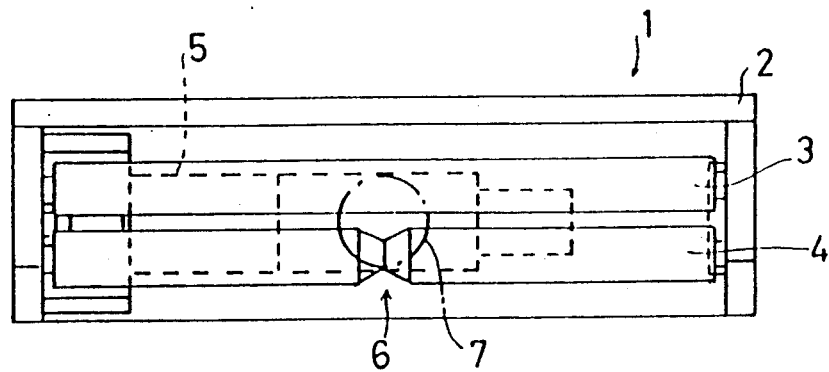
FIG. 18 is a top view of a rotary drive mechanism of an example of prior art.
Figure 19:
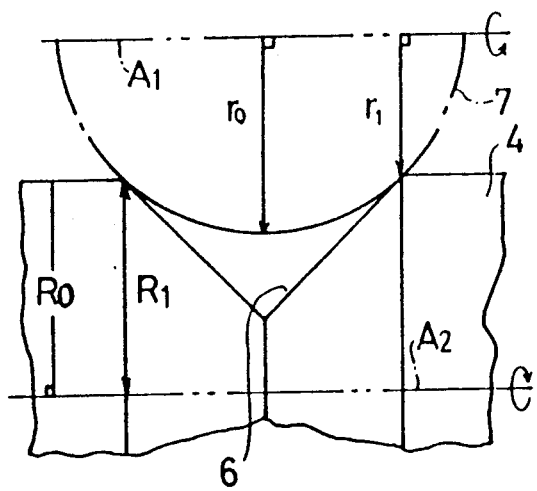
FIGS. 19 and 20 are each side views showing details of the above example of prior art.
Figure 20:
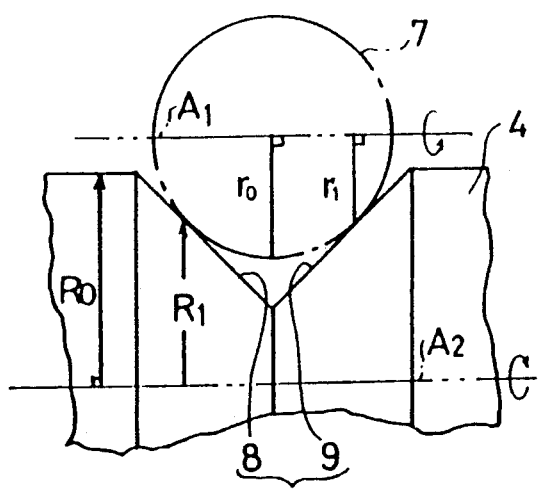
Figure 21:
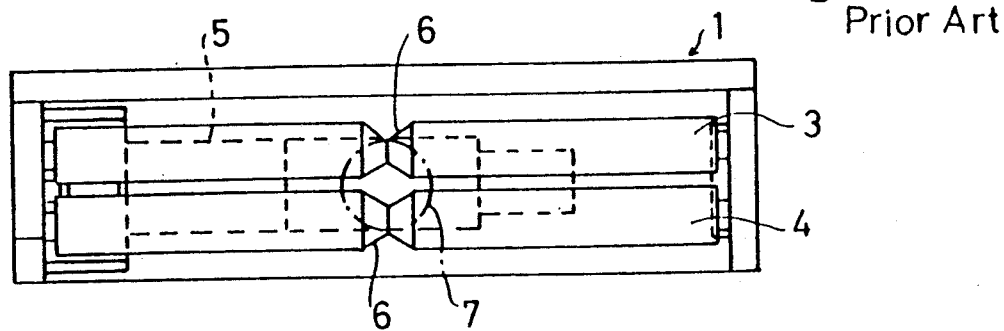
FIG. 21 is a top view of another example of prior art.

FIG. 17 shows the case of measuring the surface roughness of sphere 207 using the nose piece 210 of the surface roughness measuring instrument. While sphere 207 is being rotated by the rotary drive mechanism 201, if the sphere 207 would begin to rock centered about its point of contact on contact surfaces 252 and 253 of the holding section 251 of roller 204, the movable means 261 will act to maintain the following contact of skids 211 and 212 on the sphere 207, resulting in the tip contact section 218 of detector arm 217 maintaining an essentially fixed position relative to the sphere 207. Therefore, the tip contact section 218 will measure only the surface roughness of the round rod 216 and thus the measurement will contain no errors due to rocking of the sphere 207.

As described above, with the nose piece used in this invention, by placing between a mounting section for mounting to the surface roughness measuring instrument and a tip section which holds skids used to maintain the relative positions of the object to be measured and the stylus, a movable means which allows these two sections to rock relative to each other about an axis in the direction in which the stylus extends, even if rocking occurs while the object to be measured is rotating in order to be measured, the tip section will continue to maintain an essentially fixed position relative to the object to be measured so only the surface roughness can be measured without including any error due to rocking of the subject to be measured.

What is claimed is:

1. A surface roughness measuring instrument characterized by being provided with a rotary drive mechanism which includes two rollers, each roller having an axis, the axes being arranged in parallel to support a sphere placed thereupon for measurement of the surface roughness thereof, and a rotary drive means which has a rotary drive motor used to drive said two rollers to rotate in identical directions at equal tangential velocities, in which a holding section for supporting the sphere is formed on one of said two rollers, and a pair of surfaces which make up the holding section face each other axially along the roller and take the form of partial surfaces of spheres whose centers lie along the axis of rotation of the roller and whose diameters are equal to that of the roller.

2. In the surface roughness measuring instrument of claim 1, a surface roughness measuring instrument characterized by being provided with a nose piece which includes:

a contact section which makes contact with the sphere to be measured and detects surface roughness, a detector arm which holds said contact section in a tip thereof, a set of skids arranged in parallel on either side of said contact section which are in contact with the sphere to be measured along with the contact section when the contact section is arranged in contact with the sphere to be measured, a movable means which allows the set of skids to rock about a direction of extension of the detector arm as an axis.

3. In the surface roughness measuring instrument of claim 2, a surface roughness measuring instrument characterized by the movable means being a leaf spring included between a mounting section for mounting to the surface roughness measuring instrument itself and said tip.

4. In the surface roughness measuring instrument of claim 2, a surface roughness measuring instrument characterized by the movable means being made up of ring-shaped bearings included between the mounting section for mounting to the surface roughness measuring instrument itself and said tip, and a pivotal support member on which the bearings are pivotally supported.

5. In the surface roughness measuring instrument of claim 1, a surface roughness measuring instrument characterized by the rotary drive means including a rotating plate which rotates by receiving driving torque from the rotary drive motor and can transmit driving torque to said two rollers through friction transmission, and a pressure adjusting means which is located near said rotating plate, and is able to adjust the contact pressure at which the rotating plate maintains rolling contact with the two rollers.

6. A surface roughness measuring instrument characterized by being provided with a nose piece which includes:

a contact section which makes contact with an object to be measured and detects the surface roughness thereof, a detector arm which holds said contact section in a tip thereof, a set of skids arranged in parallel on either side of said contact section which are in contact with the object to be measured along with the contact section when the contact section is arranged in contact with the object to be measured and, a movable means which allows the set of skids to rock about a direction of extension of the detector arm as an axis.

7. In the surface roughness measuring instrument of claim 6, a surface roughness measuring instrument characterized by the movable means being a leaf spring included between a mounting section for mounting to the surface roughness measuring instrument itself and said tip.

8. In the surface roughness measuring instrument of claim 6, a surface roughness measuring instrument characterized by the movable means being made up of ring-shaped bearings included between the mounting section for mounting to the surface roughness measuring instrument itself and said tip, and a pivotal support member on which the bearings are pivotally supported.

* * * * *